United States Patent [19]

Wright et al.

[11] Patent Number: 4,512,202

[45] Date of Patent: Apr. 23, 1985

[54] PREGROOVED CENTRIFUGE TUBES

[75] Inventors: Herschel E. Wright, Santa Clara; Robert C. Wedemeyer, Menlo Park, both of Calif.

[73] Assignee: Beckman Instruments, Inc., Fullerton, Calif.

[21] Appl. No.: 453,192

[22] Filed: Dec. 27, 1982

[51] Int. Cl.[3] ........................ G01N 37/00; G01N 1/28

[52] U.S. Cl. .................................. 73/863; 73/864.91; 73/863.21; 422/72; 422/102; 494/16

[58] Field of Search ..................... 73/864.91, 864, 863, 73/863.21; 494/16; 422/72, 102

[56] References Cited

U.S. PATENT DOCUMENTS

| | | | |
|---|---|---|---|
| 1,125,834 | 1/1915 | German . | |
| 3,441,205 | 4/1969 | Young, Jr. . | |
| 3,475,127 | 10/1969 | Gilford | 73/863.21 |
| 3,750,645 | 8/1973 | Bennett et al. | 494/16 X |
| 3,825,410 | 7/1974 | Bagshawe | 422/102 X |
| 3,983,037 | 9/1976 | Lee et al. | 422/72 X |
| 3,991,627 | 11/1976 | Laird et al. | 73/804.91 X |
| 4,055,282 | 10/1977 | Komendowski | 222/421 |
| 4,066,414 | 1/1978 | Selby | 422/102 |
| 4,334,028 | 6/1982 | Carver | 422/102 X |
| 4,372,483 | 2/1983 | Wright | 494/16 |

*Primary Examiner*—Stewart J. Levy
*Assistant Examiner*—Tom Noland
*Attorney, Agent, or Firm*—R. J. Steinmeyer; W. H. May; P. R. Harder

[57] ABSTRACT

A thick walled centrifuge tube with a generally constant internal diameter and having at least one circumferential groove within the exterior surface of the tube. The groove is designed to have a depth slightly less than the wall thickness of the tube. The circumferential groove is designed to assist in slicing of the tube subsequent to centrifugation in order to isolate different separated particles of a fluid sample which have formed fraction bands at certain levels in the tube. The groove reduces the cutting force required to partition the tube. The groove provides a guide for a slicing blade. The groove is formed in such a manner that a fluid tight seal is formed between the slicing blade and the tube as the blade proceeds through the tube. The centrifuge tube wall at the base of the groove, after slicing, is resilient enough to allow the tube sections to be rejoined under force and create a fluid tight seal.

12 Claims, 8 Drawing Figures

PREGROOVED CENTRIFUGE TUBES

BACKGROUND OF THE INVENTION

The present invention is directed to a centrifuge tube and, more particularly, is directed to a thick walled polymer centrifuge tube having a circumferential groove that enhances partitioning of the tube subsequent to centrifugation.

The investigative analysis of various fluid samples requires a separation of components or fractions in fluid samples using centrifugation. It is important that no subsequent inherent contamination occurs between the separated components in the sample within the same centrifuge tube. When the separated fractions have a tendency to adhere to the interior of the centrifuge tube wall surface, a portion of the separated fraction may maintain adherence to the tube wall when the tube is returned to an upright position after centrifugation. This could cause subsequent contamination between the fractions as they are removed from the centrifuge tube.

In some instances, especially with a smaller centrifuge tube, it is desirable or more convenient to not use a tube cap or seal. However, the open end of a centrifuge tube is not as structurally strong as it is with a tube cap in place. Consequently, during centrifugation the open end of the tube without a tube cap might deform or bend. To avoid any possible deformation at the open end of the tube the thickness of the tube wall is increased to provide inherent strength during centrifugation. Thick walled centrifuge tubes do not require a tube cap to provide strength to the open end of the tube.

When it is desirable subsequent to centrifugation to separate the fraction bands and prevent contamination, a typical approach has been to utilize some type of slicer blade to cut through the tube and partition the tube between the respective separated bands of fractions. While slicing thick wall centrifuge tubes the blade tends to wander or not follow the precise intended path. In some instances the blade may break because certain thick wall tubes are made of a relatively hard polymer that has been virtually impossible to slice. Because high forces are required to force the blade through the full tube section, the blade life is relatively short.

In the prior art, tube slicing has occurred using visual alignment on the tube exterior to position the blade. However, this approach may cause problems when one desires a high degree of precision and accuracy because of the inherent dimensional inconsistencies in the visual alignment approach on the outer surface of the tubes that reduces the accuracy of partitioning for the internal volumes.

Once the tube is fully partitioned, the upper portion of the tube having a separated fraction band can be subjected to various manipulations such as dilution, mixing and removal. However, quite often there may be some type of leakage which occurs between the blade and the upper portion of the partitioned tube causing possible loss of the desired sample as well as possible leakage and contamination of a lower fraction which is in the bottom portion of the tube.

SUMMARY OF THE INVENTION

The present invention is directed to a thick walled centrifuge tube having one or more circumferential grooves recessed within the outer surface of the tube. The groove is located at a precise position along the length of the tube so that any subsequent slicing of the tube will isolate various separated bands of the fluid sample subsequent to centrifugation. Therefore, the location of the groove is related to the type of fluid sample being centrifuged. It is envisioned that a user would choose a tube with the desired groove location out of a plurality of tubes having varying groove locations.

The depth of the groove within the thick wall of the centrifuge tube is at least one-half the thickness of the tube creating a thinner connecting portion between the two sections of the tube divided by the groove. When the tube is being partitioned by a slicing blade, the thin portion at the base of the groove provides a fluid tight seal between the knife blade and the tube portion. Also, when the sections of the tube are rejoined after severing, these thinner portions of the connecting portion of the tube will also provide a fluid tight seal when the sections of the tube are held together under force.

The circumferential groove also provides a desired guide path for the blade of the tube slicer so that it does not wander or move out of the desired severing plane. The width of the groove is made approximately equal to or slightly less than the thickness of the blade used in the slicing operation.

DETAILED DESCRIPTION OF THE PRESENT INVENTION

Figure 1:
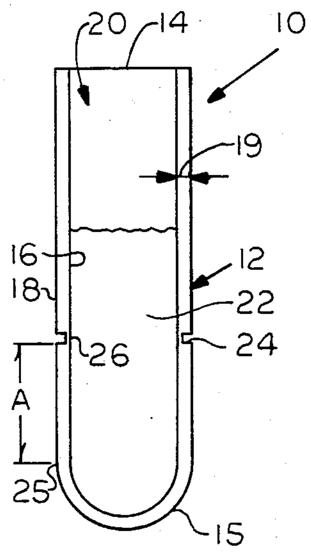
FIG. 1 is a vertical sectional view of the present invention.

FIG. 1 shows a centrifuge tube 10 of the present invention made of a polymer material and having a generally cylindrical main portion 12 with an open end 14 and an enclosed integrally formed bottom portion 15. The centrifuge tube 10 has an interior surface 16 and an exterior surface 18. Received within the interior cavity or chamber 20 of the tube is a fluid sample 22 that is to be subjected to centrifugation. Recessed within the exterior surface 18 of the tube is a circumferential groove or channel 24 which is located a desired distance A from the junction 25 between the enclosed bottom portion 15 and the generally cylindrical main portion 12 of the tube. As will be explained, the precise distance A is designed to be compatible for the separation of a particular fluid sample in the tube. The distance A would be different in other tubes for use with other fluid samples. The depth of the groove 24 into the surface 18 of the tube is preferably more than half of the thickness 19 of the tube wall. The distance between the interior surface 16 and the exterior surface 18 of the tube determines the wall thickness 19. A connecting portion 26 is formed at the bottom of the groove and maintains the integrity of the tube. The internal cavity 20 of the tube has a generally uniform interior diameter.

Figure 2:
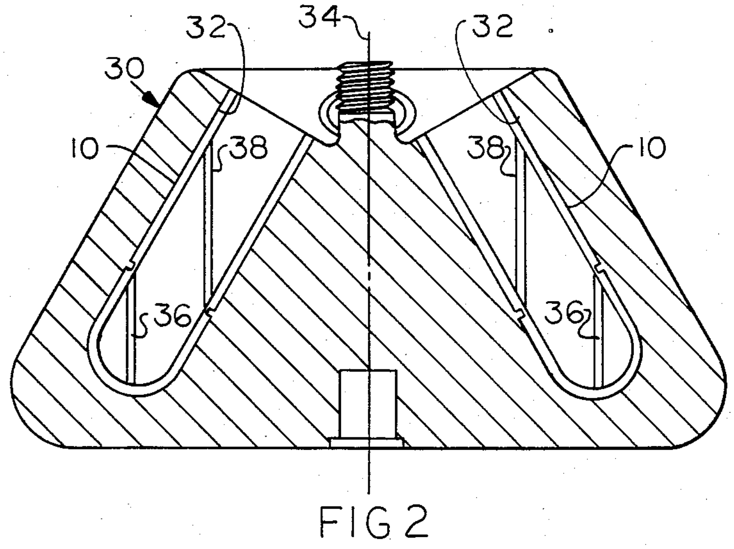
FIG. 2 is a sectional view of a fixed angle rotor having the tube of the present invention located in a tube cavity.

Once the tube with its precisely located circumferential groove 24 has received the correct amount and type of sample 22 to be centrifuged, the tube 10 is placed within a rotor 30 as shown in FIG. 2. In many instances, the centrifugation is accomplished in a fixed angle type of rotor such as shown in FIG. 2 wherein the tube cavities 32 in the rotor are oriented at an angle with respect to the spin axis 34 of the rotor. When the rotor is operated at the desired speed for the desired separation in the fluid sample, particular bands or fractions of different density particles 36 and 38 will form within the centrifuge tube. These separated fraction bands are of importance with respect to analysis of the fluid sample. However, it is important that the bands do not become contaminated or remixed subsequent to centrifugation.

Figure 3:
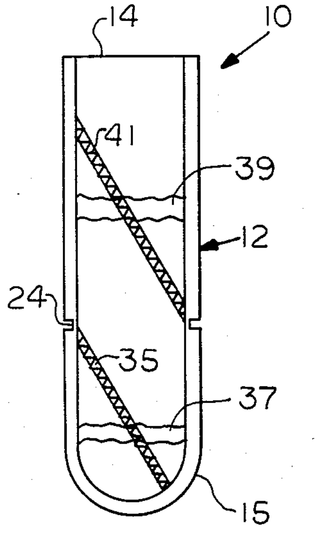
FIG. 3 is a vertical sectional view of the tube showing the reoriented separated bands of material with a portion adhering to the walls of the tube subsequent to centrifugation.

Once the operation of the rotor is complete, the tube 10 is removed and is typically positioned vertically on a work table as shown in FIG. 3. The separated elliptical bands 36 and 38 will tend to reorient into horizontal bands 37 and 39. However, if the fluid sample is gelatinous or has a tendency to adhere to the centrifuge wall, a certain portion of the separated bands 36 and 38 may tend to remain attached to the tube wall. In order to maintain the separation of the upper horizontal band 39 and its residual elliptical band 41 from the lower horizontal band 37 and its residual elliptical band 35, a tube slicer is used to physically separate the tube into two isolated sections.

Figure 4:
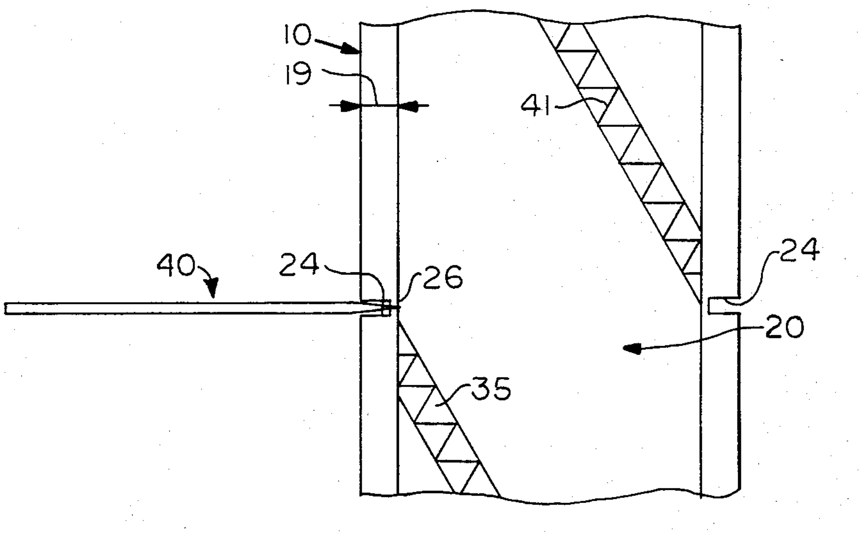
FIG. 4 is an enlarged partial sectional view of the tube showing a tube slicing knife blade initiating the penetration of the tube.

In FIG. 4, an enlarged portion of the tube with the circumferential groove 24 is shown with a tube slicing knife blade 40 positioned within the groove 24 ready to pierce the circumferential connecting portion of junction 26. Since the thickness of the connecting portion 26 is significantly less than the thickness 19 of the tube, the amount of force necessary to project the blade through the tube is reduced as compared to having to force the knife blade through the complete thickness 19 of the tube. Also, as the knife is moved from left to right with respect to FIG. 4, the groove acts as a guide for the knife blade to prevent possible wandering of the blade. It should be noted that the knife blade 40 has a surface area larger than the horizontal sectional area of the tube including its interior chamber 20. Therefore, as the knife proceeds through the tube, it forms in FIG. 5 a separating surface or partition between respective sections of the tube 42 and 44 and the respective upper 39 and 41 and lower 37 and 35 horizontal bands and residual portions of the fluid sample.

Figure 5:
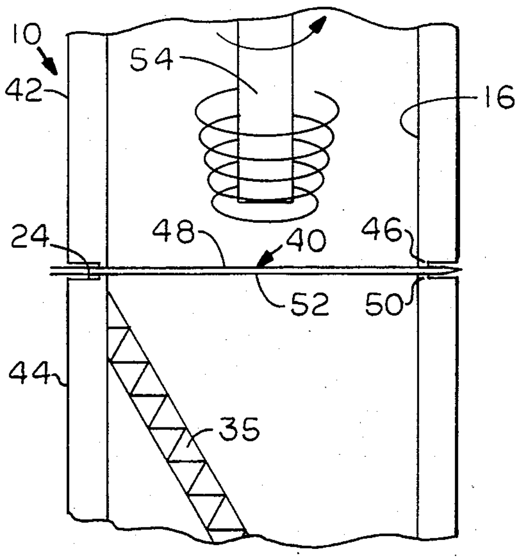
FIG. 5 shows the slicing blade completely through and severing the tube of the present invention to allow analysis of the sample in the upper section of the tube.

Once the knife 40 is completely through the tube as shown in FIG. 5, the tube then is partitioned into the two separate isolated sections 42 and 44. The separate centrifugated band 38 is located in the upper section 42 while the centrifugated band 36 is found in the lower section 44. The lower circumferential rib or lip 46 which is formed on the upper section 42 as a result of the slicing or separation of the connecting portion 26 will provide a fluid tight seal against the top surface 48 of the knife 40. Similarly, the upper circumferential rib 50 formed on the lower section 44 forms a fluid tight seal with the lower surface 52 of the blade.

Figure 6:
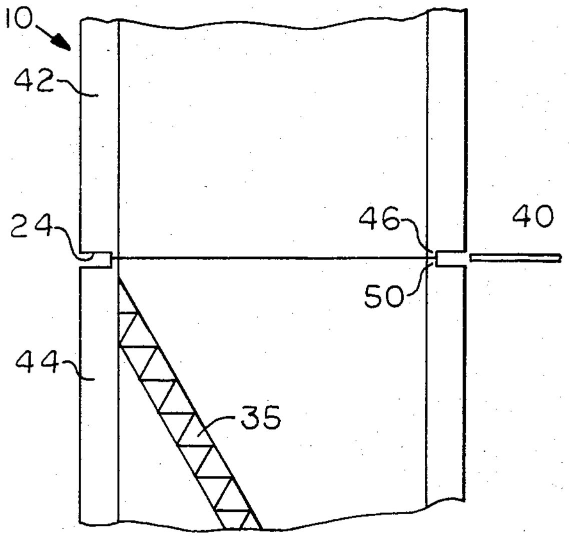
FIG. 6 shows the sections of the tube being rejoined with the slicing blade removed.
Figure 7:
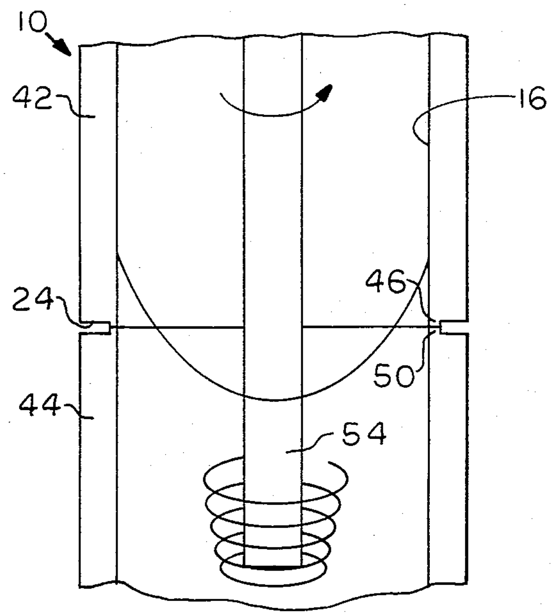
FIG. 7 shows the tube sections rejoined under force and analysis being undertaken with respect to the sample in the lower section of the partitioned tube.

When the blade 40 is completely through the tube 10 to form the separate sections 42 and 44, analysis or various manipulations such as dilution, mixing or removal can be accomplished through the upper end 14 on the upper fraction band 39. As shown in FIG. 5, the interior surface can be scrubbed by a tool 54 to remove all the residual portion 41 so that, when a sample is removed from the upper section 42 of the tube all the separated constituents are included to provide the desired accurate count. This will not disturb the lower fraction band 37 in the lower section 44, because of the isolation created by the tube slicing knife 40. Once the upper band 39 and its residual portion 41 are removed from the upper section 42 of the tube and when the knife blade has been extracted, the upper section 42 can then be rejoined with the lower section 44 shown in FIG. 6. The lip portions 46 and 50 of the respective tube sections 42 and 44 of the tube are rejoined under force. Because the lip portions 46 and 50 are resilient, they will maintain a fluid tight seal against each other. Subsequently, analysis can be carried out within the lower section 44 on the lower band 37. Attention is directed to FIG. 7 showing the scrubbing of the tube interior surface 16 by the tool 54 to remove the adhering residual portion 35 of the lower band 37. Since the circumferential ribs 46 and 50 are flexible and create a fluid tight seal under force, no fluid will escape during this process. Subsequently, the fluid may be removed or retained in the tube for analysis.

Figure 8:
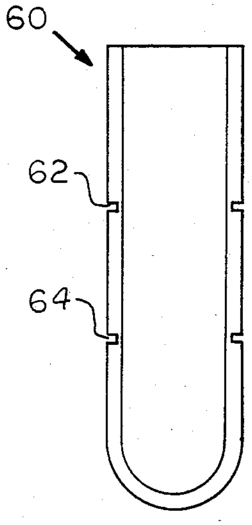
FIG. 8 shows an alternate embodiment of the present invention.

As shown in FIG. 8, an alternate embodiment 60 of the present invention could incorporate more than one circumferential groove so that several partitions can be made of the centrifuge tube subsequent to centrifugation to allow physical isolation of various separated fluid sample bands within the tube. Although the alternate embodiment shows two grooves 62 and 64, it is envisioned that the present invention would encompass several grooves depending upon the size and length of the tube as well as the type of fluid sample being centrifugated.

Also envisioned within the scope of the present invention is progrooving the thick-walled tube after centrifugation and prior to tube slicing. In this manner a user may select after centrifugation which band or bands of separated material he wishes to isolate. Some users may desire this added flexibility as opposed to the use of a tube which has been pregrooved prior to centrifugation. It is envisioned that to accomplish the pregrooving after centrifugation the tube will be secured in a stationary position and the cutting means will rotate around the tube so that the fluid sample is not disturbed.

What is claimed is:

1. A centrifuge tube for separation of the constituents in a fluid sample and for receipt of a tube slicer blade to partition said tube into at least two sections for isolation of centrifugated bands of constituents of said samples, said tube comprising:

a hollow cylindrical body portion with one end enclosed to form an interior chamber;

a circumferential groove formed in the exterior surface of said body portion to create at least two sections of said body portion; and a connecting portion adjacent said groove and joining said two sections, for rejoining said two body sections under force to form a fluid tight seal after said body portion is severed by said tube slicer blade.

2. A centrifuge tube as defined in claim 1, wherein said groove receives the tube slicer blade to partition said two sections, each of said two sections when partitioned having a raised circumferential lip.

3. A centrifuge tube as defined in claim 2, wherein said lip comprises a flexible seal against said slicer blade as it partitions said tube.

4. a centrifuge tube as defined in claim 2, wherein each of said lips comprises a seal when said sections are rejoined under force.

5. A centrifuge tube comprising:

a generally cylindrical wall forming an interior chamber, said wall having an exterior surface and an interior surface;

a bottom integrally formed with said wall and enclosing one end of said chamber; and a groove formed in said wall, said groove recessed in said body to form at least two sections in said tube joined by a connecting portion; and said connecting portion being designed to form a raised circumferential lip on each of said sections when a slicer blade partitions said two sections.

6. A centrifuge tube as defined in claim 5, wherein said groove has a depth of at least one-half the distance from said exterior surface to said interior surface of said wall.

7. A thick walled centrifuge tube for receipt of a slicer blade to form at least two sections of said tube, said tube comprising:

a generally cylindrical body portion having an exterior surface and an interior surface;

an end portion integrally formed with said body portion to form an interior chamber;

means comprising a circumferential groove, recessed within said exterior surface, for guiding said slicer blade along a desired cutting plane of said body portion, for dividing said tube into at least two sections; and a connecting portion adjacent said groove, designed in such manner that a raised circumferential lip is formed on each of said sections after said slicer blade partitions said two sections.

8. A thick walled centrifuge tube as defined in claim 7, wherein said raised circumferential lip is flexible and forms a fluid tight seal with said slicer blade.

9. A thick walled centrifuge tube for use with a tube slicer blade to partition the tube into at least two sections, said tube comprising:

a hollow cylindrical portion having an interior surface and an exterior surface;

a bottom portion integrally formed with said cylindrical portion to form an enclosed internal chamber;

a circumferential groove recessed in said exterior surface dividing said tube into two sections; and a narrow connecting portion adjacent said groove and joining said two sections, said groove receiving said slicer blade to partition said two sections, said connecting portion forming a flexible lip that adheres to said slicer blade to form a fluid tight seal between said tube and said slicer blade as said slicer blade moves through said tube.

10. A method for slicing a thick-walled centrifuge tube, said method comprising the steps of:

filling said tube with a fluid sample;

centrifuging said tube to separate said sample into bands of material of varying density;

pregrooving a cylindrical channel at a position on the exterior of said tube between at least two of said bands; and slicing said tube through said channel to form two separate sections of said tube, each of said sections having a raised circumferential lip thereon.

11. A method as defined in claim 10 wherein said progrooving step comprises:

securing said tube in a stationary position; and rotating a cutting means around said stationary tube at said position to form said channel.

12. A centrifuge tube for separating layers in a fluid sample and for receiving a tube slicer blade to partition the tube into at least two sections, each section containing a layer of the fluid sample so that the layers may be separated without contamination of one layer with the other, comprising:

a hollow cylindrical body having an enclosed end to form a hollow chamber, said body having a plurality of longitudinally spaced exterior circumferential grooves therein for receiving and guiding the slicer blade to partition said body to selectively separate fluid layers in said body; and a connecting portion adjacent each groove, said connecting portion forming a pair of facing circumferential lips in adjacent sections formed as said body is sliced, each of said circumferential lips forming a seal with the slicer blade as it passes through said body.

* * * * *